(12) United States Patent
Stobbe et al.

(10) Patent No.: US 7,425,895 B2
(45) Date of Patent: Sep. 16, 2008

(54) READER DEVICE FOR CONTACTLESS READING OF TRANSPONDER DATA

(75) Inventors: Anatoli Stobbe, Barsinghausen (DE); Werner Jahoda, Bad Nenndorf (DE)

(73) Assignee: ASTRA Gesellschaft für Asset Management mbH & Co. KG, Barsinghausen (DE)

( * ) Notice: Subject to any disclaimer, the term of this patent is extended or adjusted under 35 U.S.C. 154(b) by 43 days.

(21) Appl. No.: 11/265,412

(22) Filed: Nov. 2, 2005

(65) Prior Publication Data

US 2006/0097850 A1    May 11, 2006

(30) Foreign Application Priority Data

Nov. 9, 2004    (DE)    ........................ 10 2004 054 341

(51) Int. Cl.
*G08B 13/14* (2006.01)
(52) U.S. Cl. ............... 340/572.1; 340/505; 340/538.15; 340/539.1; 340/10.1
(58) Field of Classification Search .............. 340/572.1, 340/505, 506, 538.15, 59.1, 10.1, 10.3, 539.1
See application file for complete search history.

(56) References Cited

U.S. PATENT DOCUMENTS

| | | | | |
|---|---|---|---|---|
| 5,485,154 A | | 1/1996 | Brooks et al. | |
| 5,955,951 A | * | 9/1999 | Wischerop et al. | 340/572.8 |
| 6,078,251 A | * | 6/2000 | Landt et al. | 340/10.41 |
| 6,208,235 B1 | * | 3/2001 | Trontelj | 340/10.1 |
| 6,650,227 B1 | * | 11/2003 | Bradin | 340/10.3 |
| 7,015,802 B2 | * | 3/2006 | Forster | 340/445 |
| 7,197,279 B2 | * | 3/2007 | Bellantoni | 455/41.2 |
| 7,227,468 B1 | * | 6/2007 | Florio | 340/572.1 |

FOREIGN PATENT DOCUMENTS

| | | |
|---|---|---|
| DE | 199 30 132 A1 | 1/2000 |
| WO | WO 97/07413 | 2/1997 |

* cited by examiner

*Primary Examiner*—Daryl C Pope
(74) *Attorney, Agent, or Firm*—Collard & Roe, P.C.

(57) ABSTRACT

Described is a reader device for contactless reading of transponder data via an electromagnetic field having a read antenna connected to a receiving circuit for demodulation and preparation of transponder data.

The reader device includes a digital signal processor that is connected to or forms part of the receiving circuit for generating a display signal showing an amplitude-time curve and/or a frequency spectrum of the received signals. The display signal travels via a display signal output of the digital signal processor to an optical display device integrated in the reader device or via an integrated interface to an external optical display device.

21 Claims, 8 Drawing Sheets

READER DEVICE FOR CONTACTLESS READING OF TRANSPONDER DATA

Reader devices and transponders are being used increasingly for goods production, storage, and logistics. Since other electrical or electronic devices, machines, and systems which generate electromagnetic fields are operated at the same time in a small space, interference may occur when the transponder data is read.

Particularly in the case of passive transponders, which draw their energy from the reader device, the transmitting power of the transponders is low, and therefore as the distance between the transponder and reader device increases, electromagnetic fields emitted by neighbouring electrical or electronic devices, machines, and systems as a fundamental or harmonic wave and received directly or via reflections may be in the same order of magnitude as the read field strength of the transponder data.

In the case of conventional reader devices, which only prepare received transponder data, the transmission reliability may be estimated approximated by carrying out a statistical evaluation of erroneous and valid transmissions. However, this is not sufficient for practice.

Moreover, an oscilloscope or a spectrum analyzer to which a measuring antenna is connected may be used to measure the field strength of interfering electromagnetic fields at the application site of the reader device and the transmission reliability may be estimated via a comparison with experience values. However, since oscilloscopes and spectrum analyzers differ with respect to circuit technology and the way they process signals, and measuring antennas differ with respect to spatial design from a reader device for transponder data having an associated read antenna, the results of measurement are not directly comparable. Therefore, the oscilloscope or spectrum analyzer does not reflect the same state as a reader device for transponder data.

Another option might be to use a conventional reader device having an exposed circuit and to use an oscilloscope or frequency analyzer to pick off and evaluate signals at the exposed circuit. However, such a measuring device would also be inadequate since the connection of the oscilloscope or frequency analyzer attenuates and thus distorts the signals of the reader device, and in addition the connection lines themselves function as an antenna so that it becomes possible for interfering signals to be injected. The sensitivity to interfering signals injected in this way increases as the frequency increases and is therefore significant in the HF range and particularly in the UHF range and higher. Furthermore, components of the oscilloscope or frequency analyzer, such as combinatorial circuit parts or monitor deflection circuits, may emit interfering signals.

The object of the present invention is to provide a reader device that enables measurement of interfering electrical, magnetic, or electromagnetic fields and monitoring of interference suppression measures under operating conditions, i.e., using the same read antenna and receiving circuit.

In the case of a reader device according to the species of claim 1, this object is achieved by the features of this claim. Further refinements and advantageous embodiments are described in the dependent claims.

The selectively received electromagnetic signals are supplied to the receiving circuit via the resonant circuit of the antenna. Following analogue signal processing in the receiving circuit—depending on the initial frequency and modulation type, this processing may be down conversion to a base band or an intermediate frequency, or demodulation with or without additional amplification—the signals are supplied to a digital signal processing circuit via an A/D converter. From the output of the digital signal processing circuit, the digital signals may then be supplied to an internal or external decoder for transponder data. The signal supplied to the digital signal processing circuit still includes all signal components received by the read antenna, namely the transponder data received from the transponder as wanted signals as well as potential interfering signals from other interference sources.

Additional generation of a display signal displaying an amplitude-time curve and/or a frequency spectrum of the received signals and representation thereof on an optical display device allows measurement and thorough evaluation of the signal type and property. This provides information as to whether digital signal processing of the transponder data received from the transponder to form a valid and subsequently decodable digital signal will be successful.

A signal path for processing the transponder data and a signal path for generating a display signal representing an amplitude-time curve and/or a frequency spectrum of the received signals are preferably both routed across the same read antenna.

It is also preferable if the signal path for preparing the transponder data and the signal path for generating a display signal representing an amplitude-time curve and/or a frequency spectrum of the received signals are both routed across the same receiving circuit.

Since in order to generate this display signal the signals supplied to the digital signal processing circuit are processed by a signal processor integrated in the reader device which may be part of the digital signal processing circuit, the measurement and comprehensive evaluation of the signal type and property may be performed under operating conditions. This is due to the fact that the same read antenna and the same receiving circuit of the reader device are used as for receiving the transponder data, with the result that the same state is recorded as in the case of a reader device for transponder data.

Inaccuracies such as may occur when converting or transferring measurements from separate measuring devices for operating conditions are prevented. This also applies to interfering influences from measurement connections of external measuring devices at critical circuit points of the reader device. In addition, the influence of interference suppression measures is directly visible and may therefore be optimised in a targeted manner.

The frequency of the electromagnetic field may be in a range between 8 kHz and 2.54 GHz. An LF range between 100 kHz and 150 kHz, an HF range value of 13 MHz, a UHF range value of 900 MHz, and an SHF range value of 2.44 GHz are typical and approved. The LF and HF ranges are characterized by homogenous propagation conditions and good penetration depth, but are also subject to interfering influence from electronic devices such as monitors or HF generators, or electrical devices such as switches, high-voltage devices, or electric motors. The UHF and SHF ranges are characterised by significant read distances but are also subject to an interfering influence from reflections or neighbouring mobile telephones and data wireless networks as well as microwave devices, which may generate directly interfering signals or interfering signals from superposition during simultaneous operation. Depending on the application area of the reader device, a plurality of possible interfering influences must therefore be taken into consideration.

The integrated signal processor is preferably part of the receiving circuit and may be switched in program-controlled manner between a data processing procedure and a display signal procedure.

The circuit-related expenditure is minimized by the shared use of the signal processor, and besides cost savings, the risk of interfering injections caused by a larger circuit configuration is avoided. In particular, this constellation involving the shared use of the read antenna and the receiving device provides interfering signals with the same amplitude, phase, and frequency as when recorded by the reader device for transponder data. As a result, personnel with minimal training are able to be responsible for start-up and use both domestically and abroad.

The display signal may also include at least one detection threshold which is generated by the integrated signal processor and is able to be displayed on the display device as a two-dimensional function in addition to the amplitude-time curve and/or the frequency spectrum of the received signals.

This measure facilitates the evaluation of the measured values displayed on the display device by displaying predetermined properties regarding data preparation and decodability are displayed simultaneously in the form of an optical criterion.

The display signal may also include numerical data which is generated by the integrated signal processor, assigned to the detection threshold, and is able to be displayed together with the two-dimensional function of the detection threshold on the display device, the numerical data including information such as range, probability of detection, probability of error, or error frequency.

This data is particularly advantageous for displaying different detection thresholds for identifying their significance directly on the display device.

In addition, the signal processor may additionally include at least one controllable digital filter for the received signals.

As a result, interfering signals outside the frequency spectrum of the transponder data transmitted by the transponder are able to be attenuated. Possible interfering signals as well as the influence of the controllable digital filter on these interfering signals are able to be detected in the display of the frequency spectrum of the received demodulated signals. Implementation of the digital filter in the signal processor also minimizes the circuit-related expenditure, cost savings are achieved, and the risk of interfering injections caused by a larger circuit configuration is prevented.

In addition, at least one interfering signal detection sensor may be connected to the receiving circuit or to an additional receiving circuit and signal paths from the read antenna and the interfering signal detection sensor may be coupled with a compensation circuit for opposite-phase weighted linking of the signals from the read antenna and from the interfering signal detection sensor.

The opposite-phase, weighted linking of the signals may be achieved by additional hardware or by mathematical methods within the digital signal processing circuit.

As a result, interfering signals within the frequency spectrum of the transponder data transmitted by the transponder or having a dynamically varying amplitude, phase, and frequency may also be attenuated. Weighting makes it possible to adapt the amplitude of the opposite-phase interfering signals used for the compensation to the amplitude of the interfering signals superposed on the transponder data in order to achieve the most complete attenuation possible of the interfering signals superposed on the transponder data. Interference compensation is performed at the same time as the data processing procedure and display signal procedure in order to be able to respond dynamically to changed environmental conditions. Possible interfering signals as well as the influence of the compensation on these interfering signals are able to be detected with the display of the amplitude-time curve and/or the frequency spectrum of the received signals.

The reader device may be connected either directly or via a network to a control circuit, to which additional reader devices are also connected, and the control circuit may use control signals to alternately activate and deactivate reader devices having mutually interfering read antennas with time division multiplexing in order to read transponder data.

In this way, it is possible to alternately switch these interference sources off completely when a plurality of reader devices is used in a small space, which causes mutual interferences on the same frequency.

The reader device may be connected either directly or via a network to a control circuit to which additional reader devices are also connected, and the control circuit may be used to activate deactivated reader devices for reading the transponder data as interference detection sensors and coupled with active reader devices for reading transponder data, and the signals received from the reader devices activated as interference detection sensors may also be supplied to the compensation circuit.

In this embodiment, other reader devices may be used in auxiliary fashion as interference detection sensors, thus reducing the circuit-related expenditure in a system having a plurality of reader devices.

The reader device may include a scanner which is connected to the digital signal processor or is part of the digital signal processor for creating a display signal including a spectrum of assigned and unassigned transponder channels as well as interference sources and for displaying this on the optical display device.

In the case of transponder systems functioning in the HF, UHF, and SHF range, a plurality of transponder channels may be managed by one reader device due to the higher bandwidth. The display described then provides additional information regarding possible transponder channels being used by other reader devices or interference sources and thus facilitates the installation and interference suppression of reader devices, e.g. by changing the alignment, the location, or the mutual shielding of read antennas.

The reader device may include a scanner that is connected to the digital signal processor or is part of the digital signal processor for determining interfering signals according to amplitude, frequency, and phase and for controlling the compensation circuit for compensating interference from interference superposed on the transponder data.

In this way, multiple interference sources having different frequencies, phases, and amplitudes are able to be compensated at the same time.

Additionally, the digital signal processor is able to generate a display signal of interference-suppressible and non-interference-suppressible transponder channels and display it on the optical display device.

This display provides information as to which interference sources are able to be automatically compensated by the reader device and the cases in which this is not possible, thereby necessitating additional measures when setting up and installing the reader devices and when modifying other devices.

The present invention will be explained below with reference to the drawing.

Figure 1:
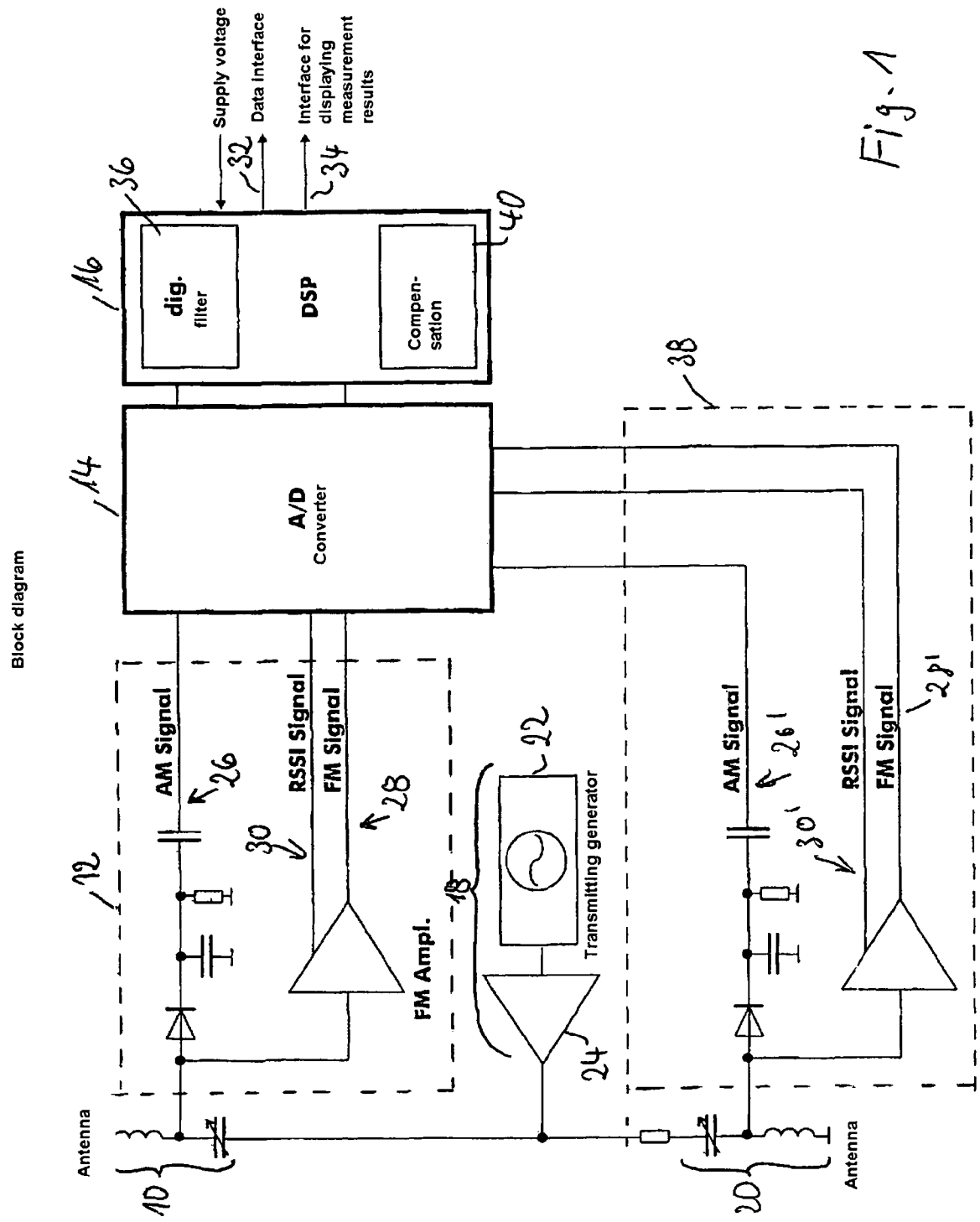
FIG. 1 shows a block diagram of a reader device.

FIG. 1 shows a block diagram of a reader device for contactless reading of transponder data across an electromagnetic field. For this purpose, the reader device includes a read antenna 10 with an adjustable read resonant circuit which is connected on the one side to a receiving circuit 12 having downstream A/D converter 14 and a subsequent signal processing circuit as digital signal processor 16, and on the other side to an energy transmitter 18 for the contactless supply of energy to the transponder. In addition, the reader device includes an interfering signal detection sensor 20 which is also connected to a receiving circuit 38.

Energy transmitter 18 is made up of an HF generator 22 and a power amplifier 24. The reader device is configured for full duplex operation as well as half duplex operation. In full duplex mode, a data telegram is transmitted from the transponder to the reader device in that the electromagnetic field generated by the energy transmitter of the reader device is dynamically attenuated by a modulator of the transponder.

In half duplex mode, energy is first transmitted from the reader device to the transponder and is temporarily stored there. The energy transmission from the reader device to the transponder is then interrupted. A data telegram is then transmitted from the transponder to the reader device in that the transponder uses the stored energy to generate an electromagnetic field itself, which is modulated by an FSK modulator.

In full duplex mode, an AM demodulator is used to recover the modulation content and in half duplex mode an FM demodulator is used to recover the modulation content. In this context, the signal paths of AM demodulator 26 and FM demodulator 28 in receiving circuit 12 are configured separately as components for analogue signal processing and are then routed together via A/D converter 14 to digital signal processor 16. A third analogue signal path 30 provides an RSSI signal which represents the receiving field strength and is additionally supplied via A/D converter 14 to digital signal processor 16.

At the output of digital signal processor 16, the digital transponder data may be supplied via a data interface 32 to a decoder and evaluated there.

In accordance with the present invention, digital signal processor 16 also generates a display signal representing an amplitude-time curve and/or a frequency spectrum of the received demodulated signals. It is particularly advantageous in this case that same read antenna 10 and same receiving circuit 12 of the reader device are used to receive and preprocess the signals for acquiring the transponder data and the display signal so that these are able to be recorded uniformly and without distortion in a direct comparison.

An optical display device integrated in the reader device and/or an interface 34 integrated in the reader device is arranged at a further output of the digital signal processor for connecting an external optical display device.

In addition, digital signal processor 16 includes a controllable digital filter 36 via which interfering signals outside the frequency spectrum of the transponder data transmitted by the transponder are able to be attenuated.

The reader device also includes at least one interfering signal detection sensor 20 which is connected to a receiving circuit 38. In this context, this receiving circuit is configured in similarly to receiving circuit 12 for the transponder signals and is also connected to digital signal processor 16 via A/D converter 14. Corresponding signal paths in additional receiving circuit 38 are designated by reference numerals 26', 28', and 30'.

Digital signal processor 16 also forms a compensation circuit 40 for opposite-phase weighted linking of the signals from read antenna 10 and interfering signal detection sensor 20. In this case, this is formed by digital signal processor 16 itself and the opposite-phase weighted linking of the signals from read antenna 10 and interfering signal detection sensor 20 is performed in a program-controlled manner using mathematical methods.

Figure 2:
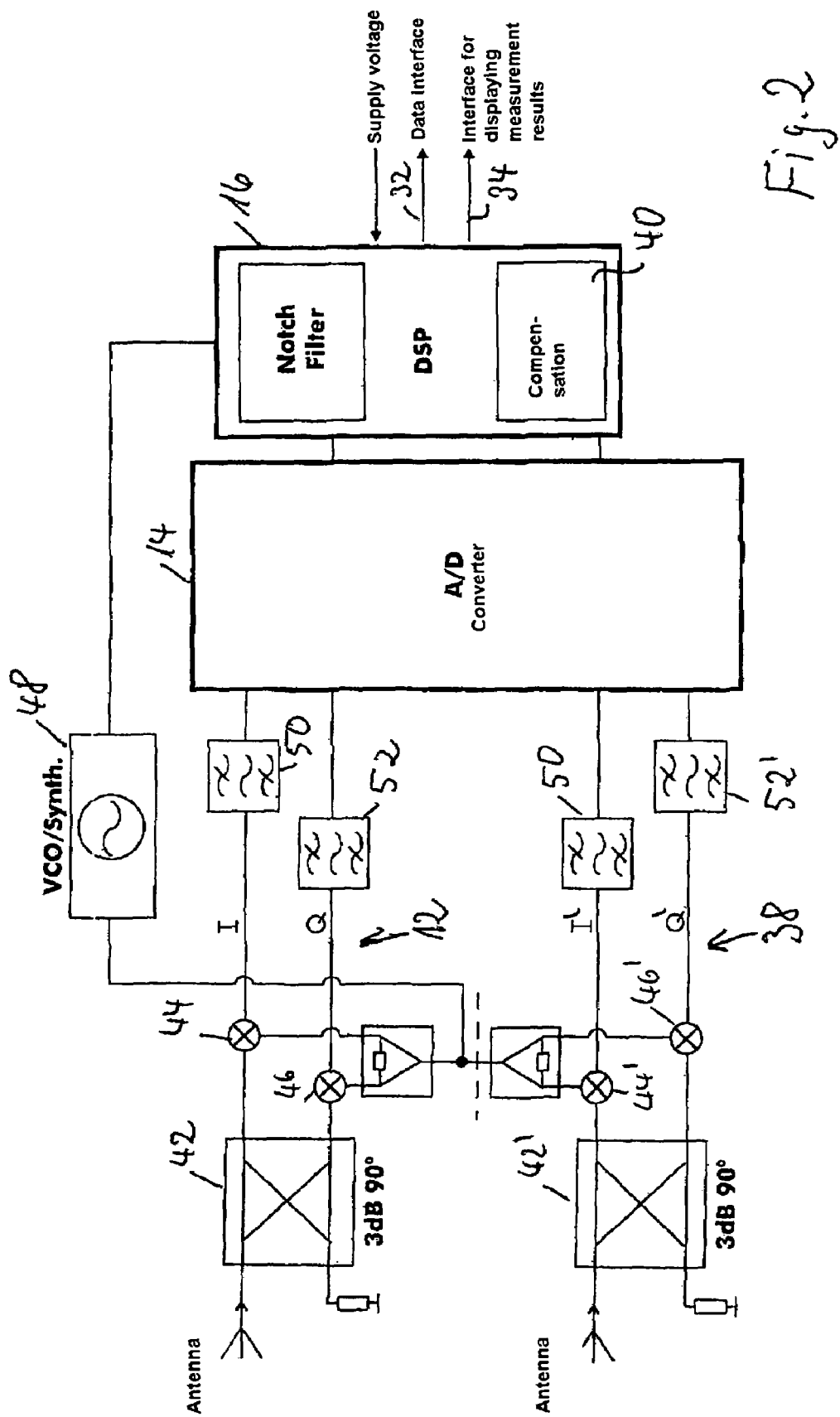
FIG. 2 shows an additional block diagram of a reader device having an additional compensation circuit.

FIG. 2 shows a further block diagram of a reader device having an additional compensation circuit. In this case, a first mixer 42 for generating output signals that are phase-shifted by 90 degrees is arranged in a receiving circuit 12 having an analogue signal path for wanted signals, and additional mixers 44, 46 for superposing an oscillator signal are situated respectively in the two output signal paths I, Q. A further receiving circuit 38 having an analogue signal path for signals detected by an interference detection sensor is configured similarly to the signal path for the wanted signals. A first mixer 42' for generating output signals phase-shifted by 90 degrees is situated there, and additional mixers 44', 46' for superposing the same oscillator signal are situated respectively in the two output signal paths I', Q'.

The oscillator signal is generated by an oscillator 48 whose frequency, amplitude, and phase are controllable by digital signal processor 16. As a result, dynamic compensation of interfering signals according to frequency, amplitude, and phase is possible.

The signal components then travel from the output of additional mixers 44, 46 through filters 50, 52 to A/D converter 14. Additional receiving circuit 38 also includes corresponding filters 50', 52' in output signal paths I', Q'.

Figure 3:
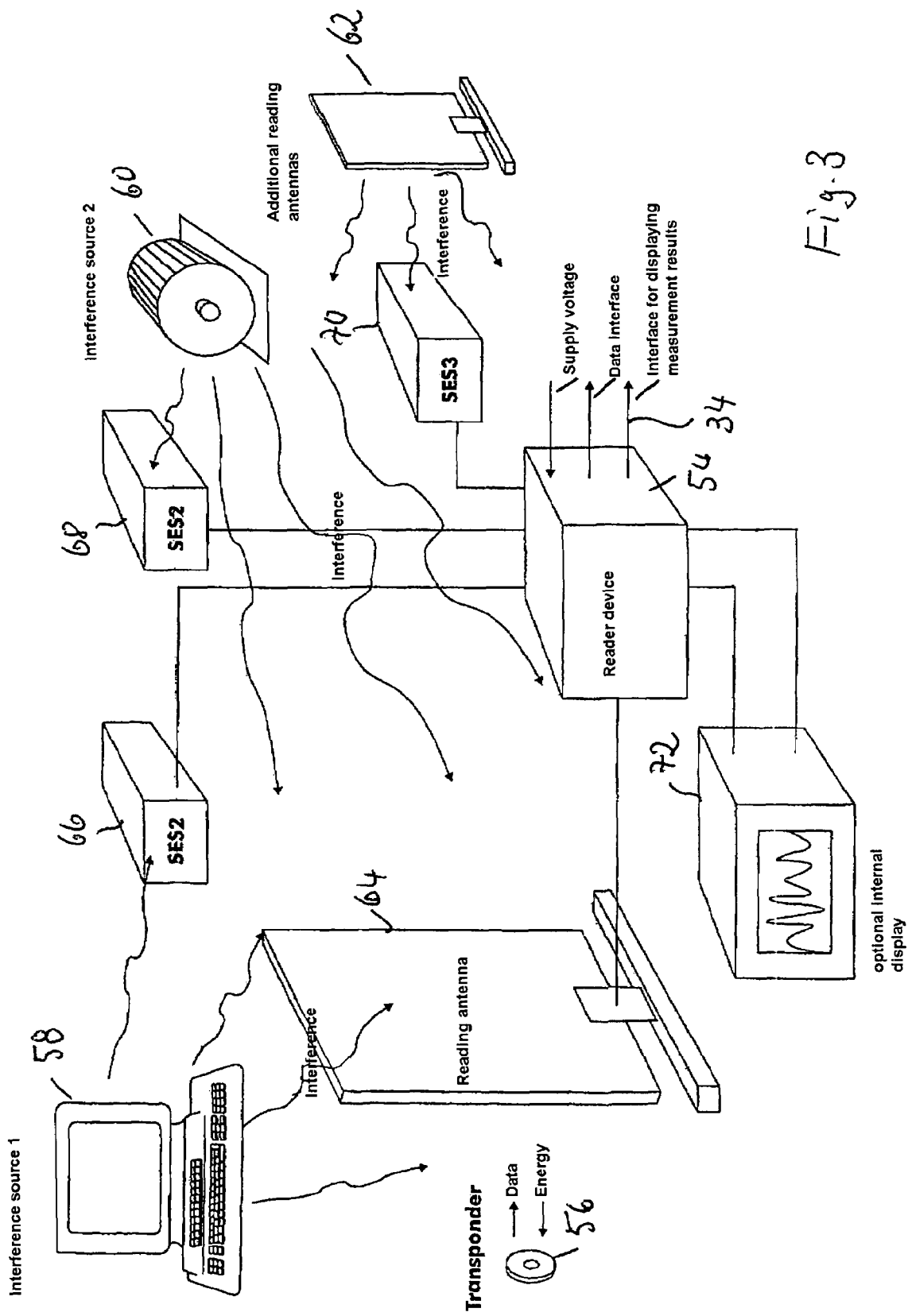
FIG. 3 shows a reader device having a transponder as well as interference sources in its surroundings.

FIG. 3 shows a representation of a reader device 54 having a transponder 56 and interference sources 58, 60, 62 in its surroundings. A read antenna 64 having a read resonant circuit in which the inductor is designed as a frame antenna is connected to reader device 54. Transponder 56 is located in its receiving range. Interference sources 58, 60, 62 in the form of a monitor, an electric motor, and an additional reader device are located in the vicinity of the read antenna. The interfering signals emitted by these interference sources 58, 60, 62 are also received by read antenna 64 and thus superposed on the transponder data. Interference detection sensors 66, 68, 70 are positioned at a distance from read antenna 64 in the vicinity of interference sources 58, 60, 62 and also receive the interfering signals coming from indicated interference sources 58, 60, 62. As a result of the compensation circuit of reader device 54, the interfering signals received by interference detection sensors 66, 68, 70 are able to be linked in an opposite-phase weighted manner to the signals from the read antenna and thus attenuated so that the transponder data may be separated from the interfering signals and decoded.

The amplitude-time curve and/or the frequency spectrum of the received signals is/are able to be displayed via an optical display device 72 which is connected directly to an output of the signal process or via an interface 34 integrated in the reader device. FIGS. 3 through 12 show examples of this.

Figure 4:
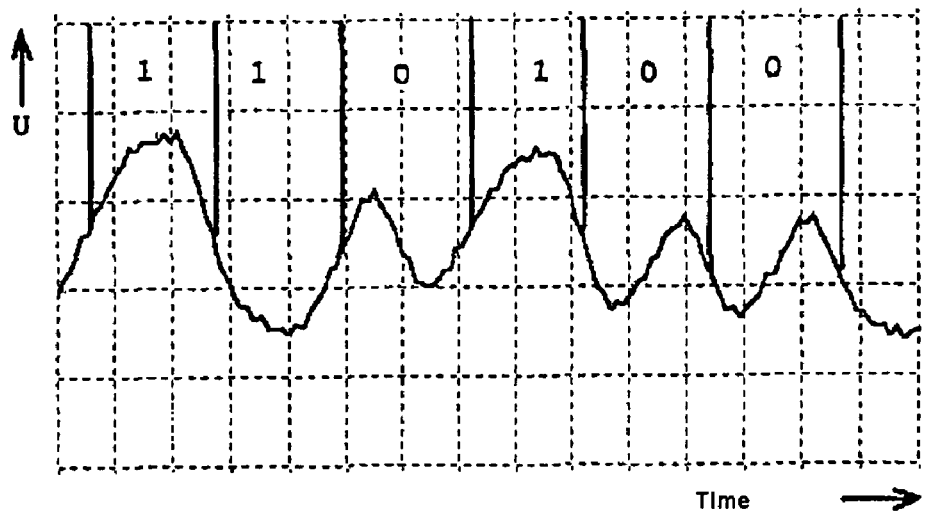
FIG. 4 shows a diagram of the display of an amplitude/time curve of a transponder signal in full duplex mode with a weak interfering signal.

FIG. 4 shows a diagram of the display of an amplitude-time curve of a transponder signal in full duplex mode with a weak interfering signal. The illustrated amplitude curve shows firstly that transponder data is being received at all and that this transponder data is only superposed by minimal harmonic waves. The amplitude curve shows clear zero crossings which allow decoding of the contained digital information as additionally shown here for the purpose of illustration.

Figure 5:
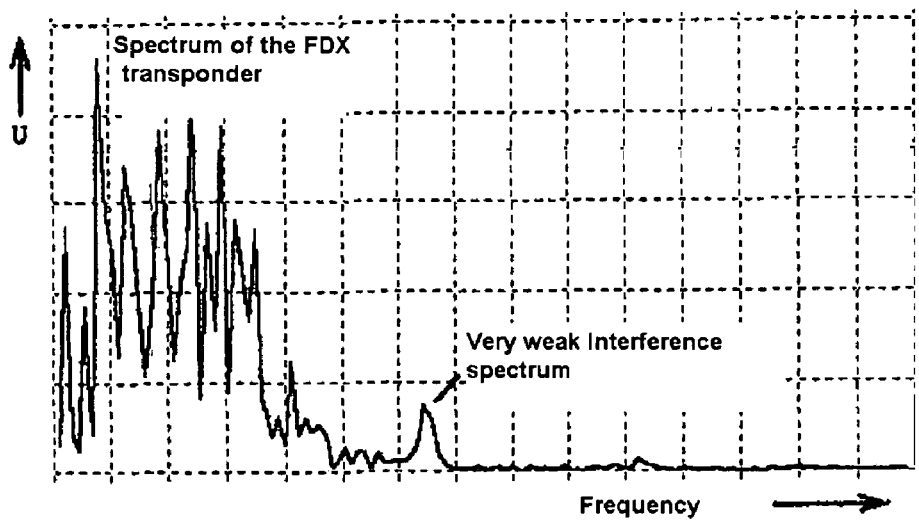
FIG. 5 shows a diagram of the display of a frequency spectrum of the same transponder signal according to FIG. 4.

FIG. 5 shows a diagram of the display of a frequency spectrum of the same transponder signal according to FIG. 4. The spectrum of the interfering signal is shown at a distance from the spectrum of the transponder signal. Its intensity is significantly lower than that of the transponder signal and therefore an interfering effect on the decodability is not to be expected.

Figure 6:
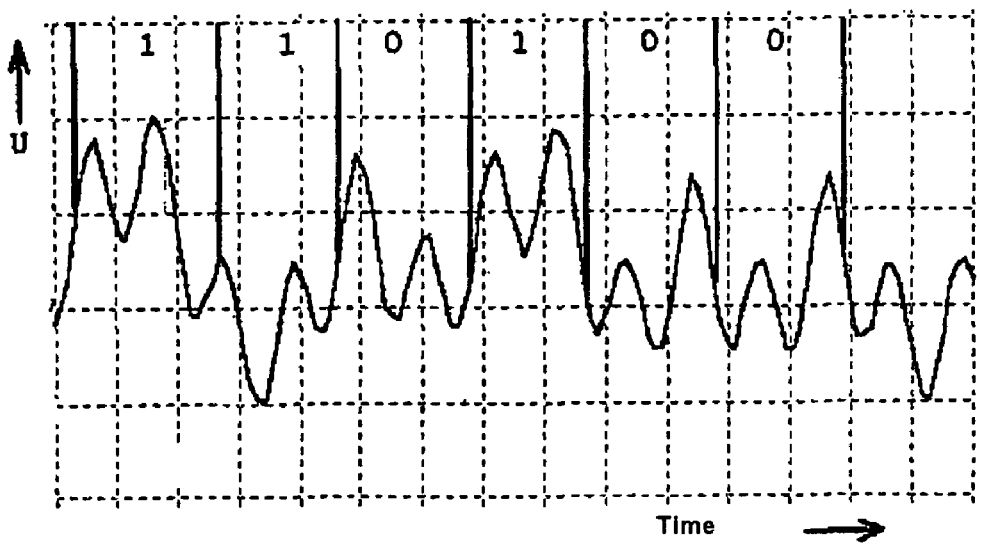
FIG. 6 shows a diagram of the display of an amplitude/time curve of a transponder signal in full duplex mode with a strong interfering signal.

FIG. 6 shows a diagram of the display of an amplitude-time curve of a transponder signal in full duplex mode with a strong interfering signal. Although the displayed amplitude curve shows that transponder data is being received, this transponder data is superposed by strong harmonic waves. The amplitude curve does not show any clear zero crossings for the wanted signals. Decoding of the digital information contained as additionally shown here for the purpose of illustration is therefore doubtful or not possible.

Figure 7:
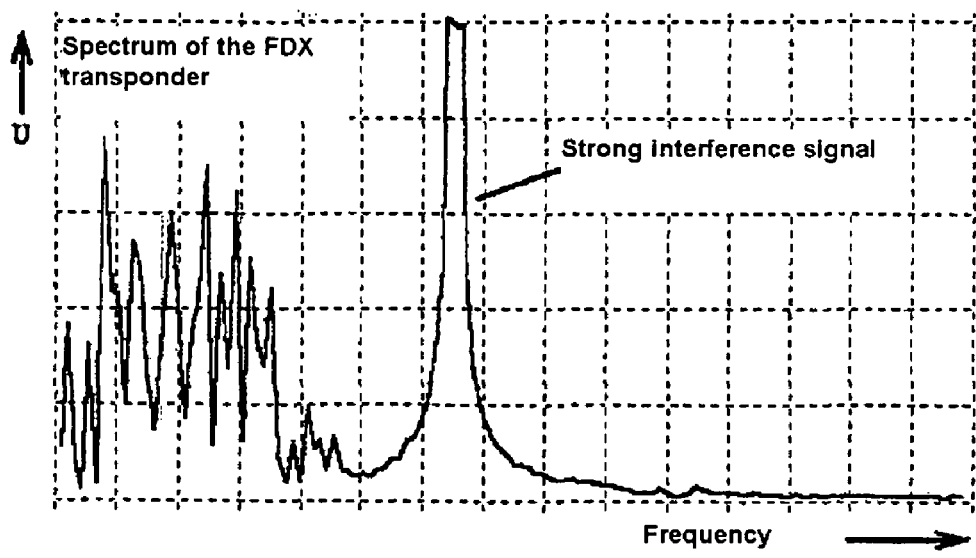
FIG. 7 shows a diagram of the display of a frequency spectrum of the same transponder signal according to FIG. 6.

FIG. 7 shows a diagram of the display of a frequency spectrum of the same transponder signal according to FIG. 6. The spectrum of the interfering signal is shown at a distance from the spectrum of the transponder signal. Its intensity is greater than that of the transponder signal and therefore an interfering effect on the decodability is to be expected.

Figure 8:
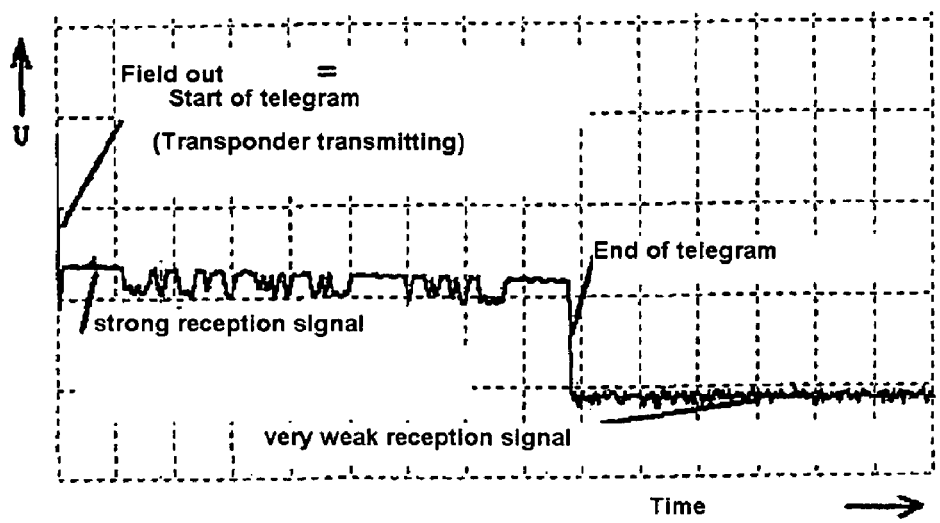
FIG. 8 shows a diagram of the display of an amplitude/time curve of a transponder signal in half-duplex mode without an interfering signal.

FIG. 8 shows a diagram of the display of an amplitude-time curve of a transponder signal in half duplex mode without an interfering signal. After the energy transmitter of the reader device is switched off, the transponder first sends an FSK-modulated data telegram and then also switches off. Shown here is the RSSI signal, which represents the receiving field strength.

The transition of the RSSI signal from a strong received signal to a weak received signal indicates that the transponder is transmitting. The amplitude fluctuations are also an indication that transponder data is being transmitted in FSK. The amplitude fluctuations result from the frequency change of the transmitted signal at a constant resonance frequency of the read resonant circuit. The amplitude fluctuations which are always constant between a maximum and minimum value indicate that the transponder signal is not superposed by interfering signals. The significant difference in the RSSI signal during the transmission phase and the rest phase of the transponder also indicates a clear signal-to-noise ratio.

Figure 9:
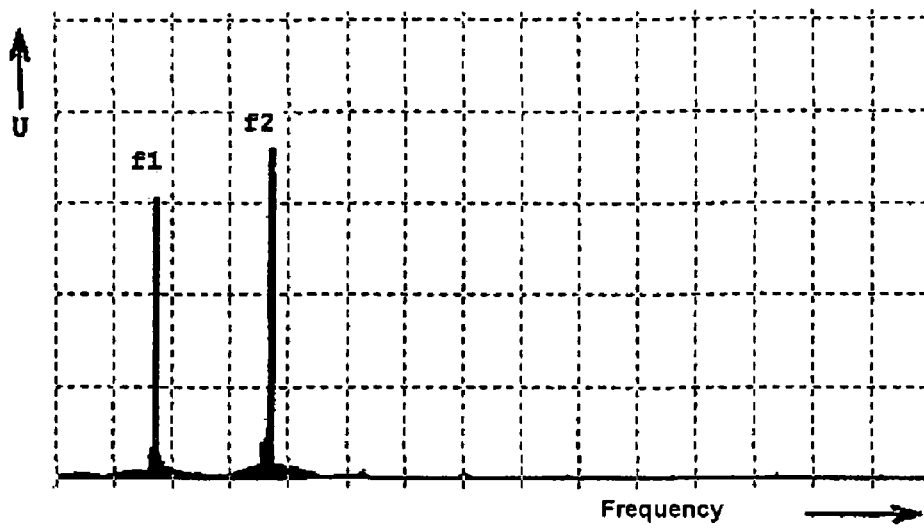
FIG. 9 shows a diagram of the display of a frequency spectrum of the same transponder signal according to FIG. 8.

FIG. 9 shows a diagram of the display of a frequency spectrum of the same transponder signal according to FIG. 8. The two spectral lines created by frequency shift keying of the signals transmitted by the transponder are visible there. Interfering signals which would result in additional spectral components are not visible.

Figure 10:
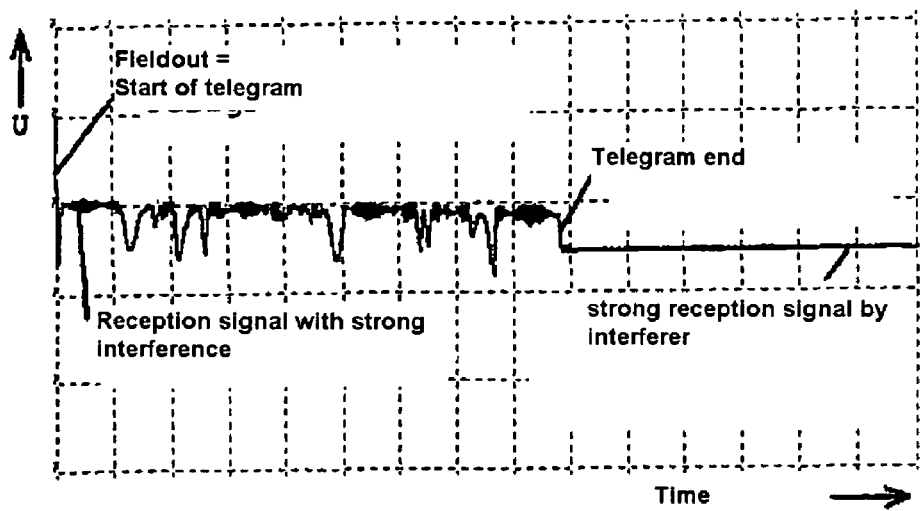
FIG. 10 shows a diagram of the display of an amplitude/time curve of a transponder signal in half-duplex mode with an interfering signal.

FIG. 10 shows a diagram of the display of an amplitude-time curve of a transponder signal in half duplex mode with an interfering signal. Although the transition of the RSSI signal from a first to a second received signal shows that the transponder is transmitting, the field strength difference is minimal and indicates the presence of an interfering signal. The amplitude fluctuations during the transmission phase are not between constant maximum and minimum values, which is also an indication of interfering signals.

Figure 11:
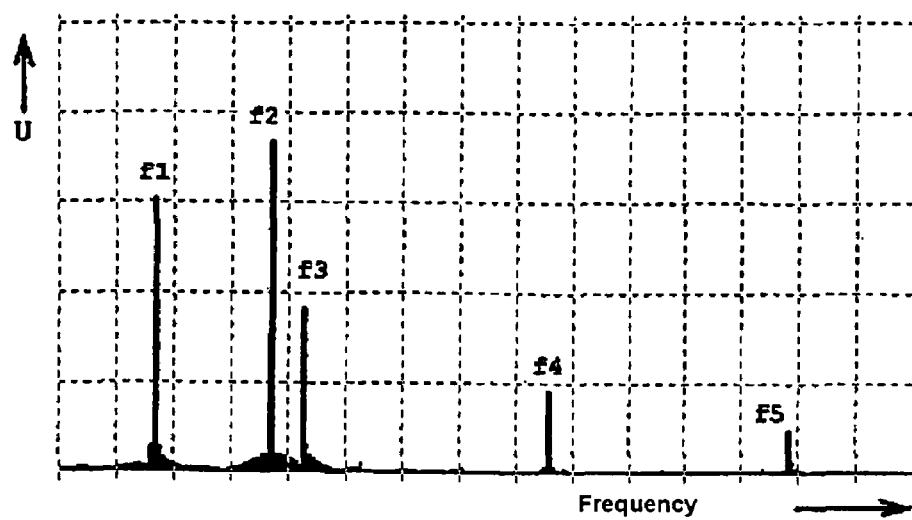
FIG. 11 shows a diagram of the display of a frequency spectrum of the same transponder signal according to FIG. 10.

FIG. 11 shows a diagram of the display of a frequency spectrum of the same transponder signal according to FIG. 10. In addition to the two spectral lines created by frequency shift keying of the signal transmitted by the transponder, additional spectral components of interfering signals are visible.

Figure 12:
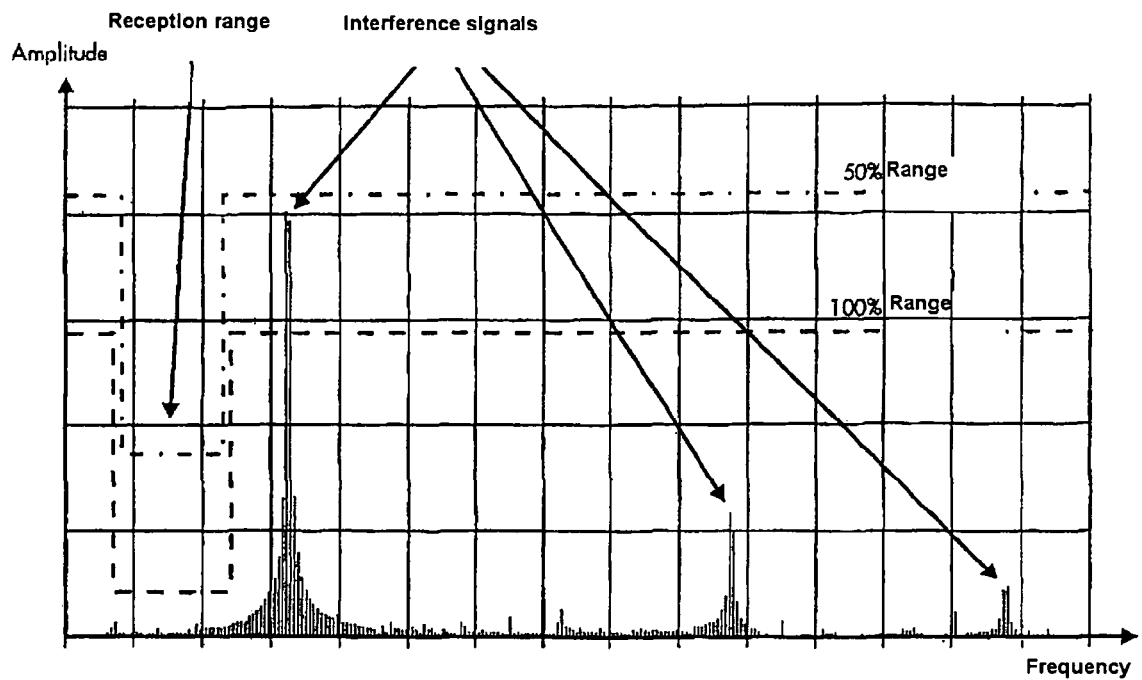
FIG. 12 shows a diagram of the display of a frequency spectrum of a transponder signal with detection thresholds shown and a strong interfering signal.

FIG. 12 shows a diagram of the display of a frequency spectrum of a transponder signal showing detection thresholds and a strong interfering signal. The detection thresholds are generated by the integrated signal processor on the basis of preliminary tests and numerical data including information regarding range is also assigned. The curve of the respective detection threshold may take into consideration selective properties of analogue or digital filters of the reader device.

In FIG. 12, a strong spectral component of an interferer is located near the receiving range and weaker spectral components of the interferer are located farther away. By showing the detection thresholds, it is evident that the strong spectral component of the interferer reduces the read range to 50% of the maximum value.

Figure 13:
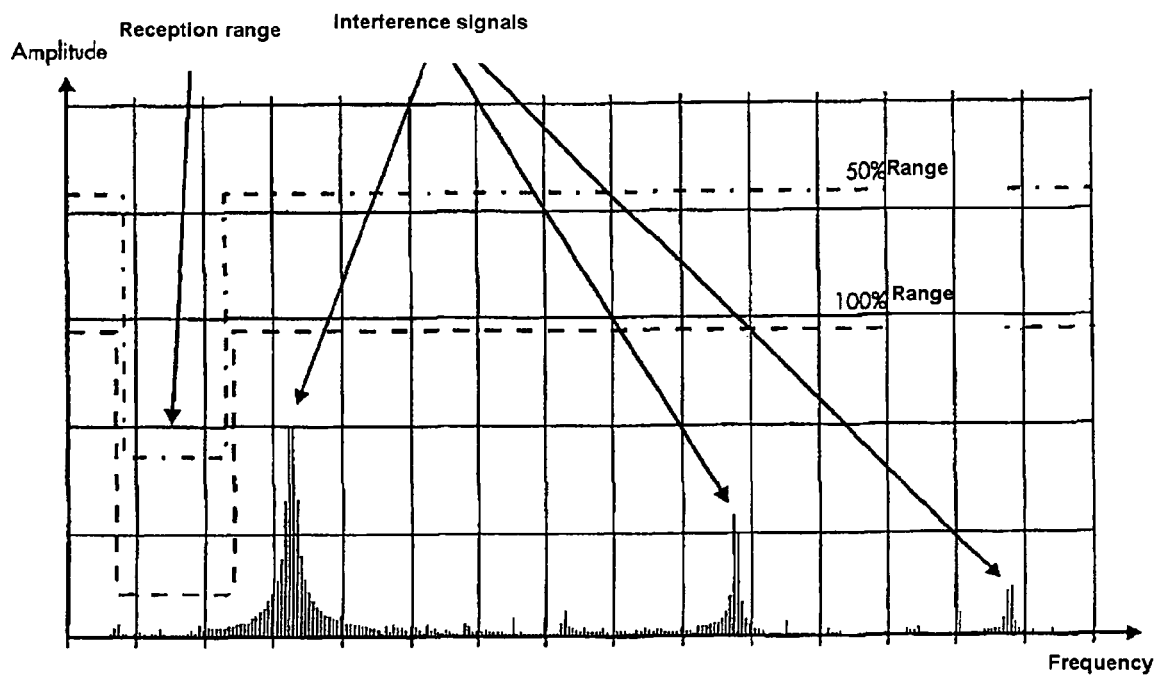
FIG. 13 shows a diagram of the display of a frequency spectrum of a transponder signal with detection thresholds shown and an interfering signal attenuated by compensation.

FIG. 13 shows a diagram of the display of a frequency spectrum of a transponder signal showing detection thresholds and an interfering signal attenuated by compensation. By showing the detection thresholds, it becomes evident that the read range is not reduced despite the spectral component of the interference source.

The invention claimed is:

1. A reader device for contactless reading of transponder data regarding an electromagnetic field, having a read antenna (10) connected to a receiving circuit (12) for demodulation and preparation of the transponder data, wherein the reader device includes a digital signal processor (16) connected to the receiving circuit (12) or forming part of the receiving circuit (12) for generating a display signal representing at least one of an amplitude-time curve and a frequency spectrum of the received signals, and wherein at least one of an optical display device integrated in the reader device for the at least one of the amplitude-time curve and the frequency spectrum of the received signals and an interface (34) integrated in the reader device for connecting an external optical display device (72) for the at least one of the amplitude-time curve and the frequency spectrum of the received signals is connected to a display signal output of the digital signal processor (16).

2. The reader device as recited in claim 1, wherein a signal path for processing the transponder data and a signal path for generating a display signal representing an amplitude-time curve and/or a frequency spectrum of the received signals are both routed via the same read antenna (10).

3. The reader device as recited in claim 1, wherein a signal path for processing the transponder data and a signal path for generating a display signal representing an amplitude-time curve and/or a frequency spectrum of the received signals are both routed via the same receiving circuit (12).

4. The reader device as recited in claim 1, wherein the frequency of the electromagnetic field is in a range between 8 kHz and 2.54 GHz.

5. The reader device as recited in claim 1, wherein the frequency of the electromagnetic field in the LF range is between 100 kHz and 150 kHz.

6. The reader device as recited in claim 1, wherein the frequency of the electromagnetic field in the HF range is at a value of 13 MHz.

7. The reader device as recited in claim 1, wherein the frequency of the electromagnetic field in the UHF range is at a value of 900 MHz.

8. The reader device as recited in claim 1, wherein the frequency of the electromagnetic field in the SHF range is at a value of 2.54 GHz.

9. The reader device as recited in claim 1, wherein the integrated signal processor (16) as a component of the receiving circuit is able to be switched in a program-controlled manner between a data preparation procedure and a display signal procedure.

10. The reader device as recited in claim 1, wherein the display signal also includes at least one detection threshold which is generated by the integrated signal processor and is able to be displayed on the display device as a two-dimensional function in addition to the amplitude-time curve of the received signals.

11. The reader device as recited in claim 1, wherein the display signal also includes at least one detection threshold which is generated by the integrated signal processor and is able to be displayed on the display device (72) as a two-dimensional function in addition to the frequency spectrum of the received signals.

12. The reader device as recited in claim 1, wherein the display signal also includes numerical data generated by the integrated signal processor (16), assigned to the detection threshold, and able to be displayed on the display device (72) together with the two-dimensional function of the detection threshold.

13. The reader device as recited in claim 12, wherein the numerical data includes information such as range, detection probability, error probability, or error frequency.

14. The reader device as recited in claim 1, wherein the signal processor (16) also includes at least one controllable digital filter (36) for the received signals.

15. The reader device as recited in claim 1, wherein at least one interfering signal detection sensor (20) is additionally connected to the receiving circuit or to a further receiving circuit (38), and that signal paths from the read antenna (10) and from the interfering signal detection sensor (20) are coupled to a compensation circuit (40) for opposite-phase weighted linking of the signals from the read antenna (10) and from the interfering signal detection sensor (20).

16. The reader device as recited in claim 15, wherein the compensation circuit (40) is formed by the digital signal processor (16), the compensation being performed in a program-controlled manner using mathematical methods.

17. The reader device as recited in claim 1, wherein the reader device is connected directly or via a network to a control circuit to which additional reader devices are also connected, and that the control circuit uses control signals to alternately activate and deactivate reader devices having mutually interfering read antennas with time division multiplexing in order to read transponder data.

18. The reader device as recited in claim 1, wherein the reader device is connected directly or via a network to a control circuit to which additional reader devices are also connected, and that deactivated reader devices for reading transponder data may be activated as interference detection sensors by the control circuit and may be coupled with active reader devices for reading transponder data, and the signals received by the reader devices activated as interference detection sensors are also supplied to the compensation circuit.

19. The reader device as recited in claim 1, wherein the reader device includes a scanner which is connected to the digital signal processor or is part of the digital signal processor for generating a display signal including a spectrum of assigned and unassigned transponder channels as well as interference sources and displaying this on the optical display device.

20. The reader device as recited in claim 15, wherein the reader device includes a scanner which is connected to the digital signal processor or is part of the digital signal processor for identifying interfering signals according to amplitude, frequency, and phase, and for controlling the compensation circuit for compensating transponder data that is superposed by interference.

21. The reader device as recited in claim 20, wherein a display signal of interference-suppressible and non-interference-suppressible transponder channels is able to be generated by the digital signal processor and displayed on the optical display device.

* * * * *